United States Patent
Ruiz et al.

(10) Patent No.: US 10,703,082 B2
(45) Date of Patent: Jul. 7, 2020

(54) METHOD FOR BUILDING THREE-DIMENSIONAL CYLINDRICAL OBJECTS

(71) Applicant: Xerox Corporation, Norwalk, CT (US)

(72) Inventors: Erwin Ruiz, Rochester, NY (US); Steven M. Russel, Bloomfield, NY (US); Paul M. Fromm, Rochester, NY (US); Jeffrey N. Swing, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 204 days.

(21) Appl. No.: 15/957,306

(22) Filed: Apr. 19, 2018

(65) Prior Publication Data

US 2018/0244033 A1     Aug. 30, 2018

Related U.S. Application Data

(62) Division of application No. 15/050,803, filed on Feb. 23, 2016, now Pat. No. 9,975,322.

(51) Int. Cl.
| | | |
|---|---|---|
| *B29C 67/00* | (2017.01) | |
| *B33Y 10/00* | (2015.01) | |
| *B29C 64/112* | (2017.01) | |
| *B29C 64/241* | (2017.01) | |
| *B33Y 30/00* | (2015.01) | |
| *B33Y 50/02* | (2015.01) | |

(52) U.S. Cl.
CPC ............ *B33Y 10/00* (2014.12); *B29C 64/112* (2017.08); *B29C 64/241* (2017.08); *B33Y 30/00* (2014.12); *B33Y 50/02* (2014.12)

(58) Field of Classification Search
CPC .... B29C 64/205; B29C 64/241; B29C 64/264
See application file for complete search history.

(56) References Cited

U.S. PATENT DOCUMENTS

| 7,983,787 B2 | 7/2011 | Garnett |
| 2012/0165969 A1 | 6/2012 | Elsey |
| 2016/0096323 A1 | 4/2016 | Fry et al. |
| 2016/0318247 A1 | 11/2016 | Schlachter |

*Primary Examiner* — James Sanders
(74) *Attorney, Agent, or Firm* — Maginot Moore & Beck LLP

(57) ABSTRACT

A method operates a three-dimensional object printer for production of cylindrical-shaped objects. The method uses a controller to operate an actuator operatively connected to a cylindrical member to rotate the cylindrical member within at least two supports, operate at least two printheads supplied with different materials to form portions of layers on the rotating cylindrical member with the different materials supplied to the at least two printheads, and operate at least one other actuator operatively connected to the at least two printheads and a curing device to move each of the printheads and the curing device independently of one another in a bidirectional radial direction with reference to a center of the rotating cylindrical member. This operation enables the curing device to be positioned to modify the layers formed on the rotating cylindrical member while the cylindrical member is rotating within the at least two supports.

11 Claims, 4 Drawing Sheets

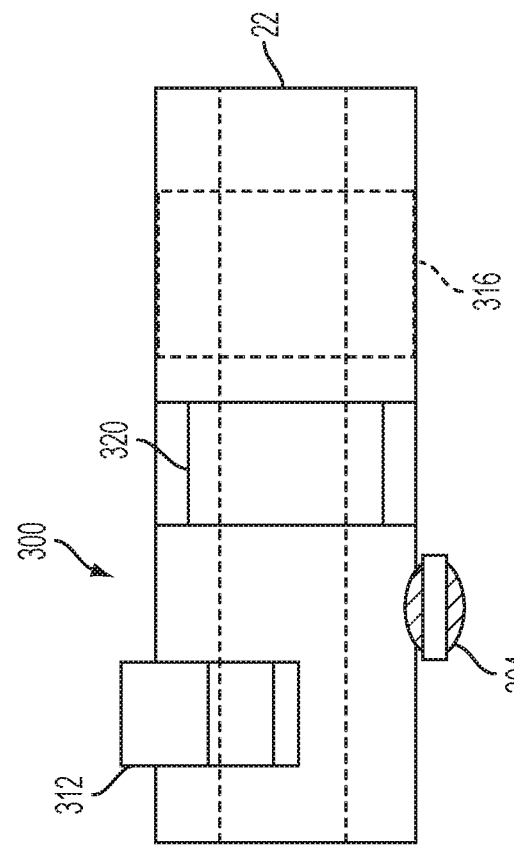
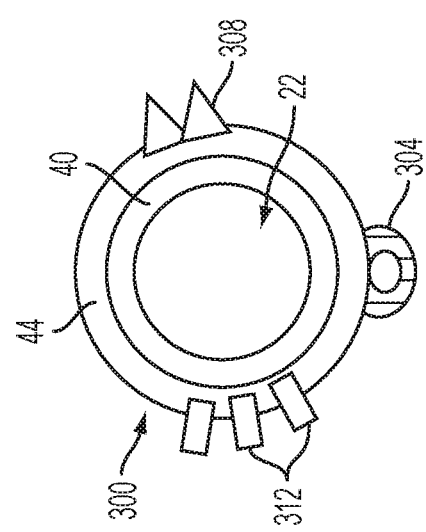
FIG. 3B
FIG. 3A

METHOD FOR BUILDING THREE-DIMENSIONAL CYLINDRICAL OBJECTS

PRIORITY CLAIM

This application is a divisional of and claims priority to U.S. patent application Ser. No. 15/050,803 entitled "Method And Device For Building Three-Dimensional Cylindrical Objects," which was filed on Feb. 23, 2016, and which issued as U.S. Pat. No. 9,975,322 on May 22, 2018.

TECHNICAL FIELD

The device disclosed in this document relates to printers that produce three-dimensional objects and, more particularly, to the production of objects with cylindrical cross-sections.

BACKGROUND

Digital three-dimensional object manufacturing, also known as digital additive manufacturing, is a process of making a three-dimensional solid object from a digital model. Three-dimensional object printing is an additive process in which successive layers of material are formed on a substrate in different shapes. The layers can be formed by ejecting binder material, directed energy deposition, extruding material, ejecting material, fusing powder beds, laminating sheets, or exposing liquid photopolymer material to a curing radiation. The substrate on which the layers are formed is supported either on a platform that can be moved three dimensionally by operation of actuators operatively connected to the platform, or the material deposition devices are operatively connected to one or more actuators for controlled movement of the deposition devices to produce the layers that form the object. Three-dimensional object printing is distinguishable from traditional object-forming techniques, which mostly rely on the removal of material from a work piece by a subtractive process, such as cutting or drilling.

One shortcoming in the production of three-dimensional objects is the ability to produce object having a cylindrical cross-sectional shape. Prior to three-dimensional printing of objects, these types of parts were made by turning a stock piece on a lathe and applying a cutter to the piece to form the cylindrically shaped piece. Similarly, these types of objects could also be formed using extruders and injection molding machines. In three-dimensional printing, three-dimensional cylindrically shaped objects are produced by forming the object from one end and building the object layer by layer. Forming irregularly-shaped objects with subtractive manufacturing techniques or providing adequate support for irregular structures formed with materials capable of being ejected so they extend from a circumference of the object can be difficult. Additionally, secondary operations, such as curing, polishing, or smoothing require removal of the object from the manufacturing station so it can be installed in a machine that performs the secondary operation. Thus, a three-dimensional object printer that can form cylindrically shaped objects with irregular features and perform secondary operations on the object without requiring removal of the object from the printing station would be useful.

SUMMARY

A three-dimensional object printer that can produce a three-dimensional cylindrically shaped object includes at least two supports configured to enable a cylindrical member to be supported and to rotate within the supports, at least two printheads, each printhead having a plurality of ejectors fluidly connected to a supply of a material, the material supply to each printhead in the at least two printheads being different than the material supplied to the other printheads in the at least two printheads, the at least two printheads being positioned about a circumference of the cylindrical member supported by the at least two supports, at least one object treating device positioned about the circumference of the cylindrical member supported by the at least two supports, an actuator configured to be operatively connected to the cylindrical member supported by the at least two supports to rotate the cylindrical member within the supports, and a controller operatively connected to the at least two printheads, the at least one object treating device, and the actuator. The controller is configured to operate the actuator to rotate the cylindrical member within the at least two supports, to operate the plurality of ejectors in each of the at least two printheads to form portions of layers on the rotating cylindrical member with the different materials supplied to the at least two printheads, and to operate the at least one object treating device to modify the layers formed on the rotating cylindrical member while the cylindrical member is rotating within the at least two supports.

A method for operating a three-dimensional printer that produces a three-dimensional cylindrically shaped object includes operating with a controller an actuator operatively connected to a cylindrical member to rotate the cylindrical member within at least two supports, operating with the controller a plurality of ejectors in each of at least two printheads supplied with different materials to form portions of layers on the rotating cylindrical member with the different materials supplied to the at least two printheads, and operating with the controller at least one object treating component to modify the layers formed on the rotating cylindrical member while the cylindrical member is rotating within the at least two supports.

BRIEF DESCRIPTION OF THE DRAWINGS

The foregoing aspects and other features of an apparatus and method that can produce a three-dimensional cylindrically shaped object are explained in the following description, taken in connection with the accompanying drawings.

FIG. 3A depicts an end view of a cylindrical object formed about a cylindrical member.

FIG. 3B depicts a longitudinal side view of a cylindrical object formed about a cylindrical member.

DETAILED DESCRIPTION

Figure 1A:
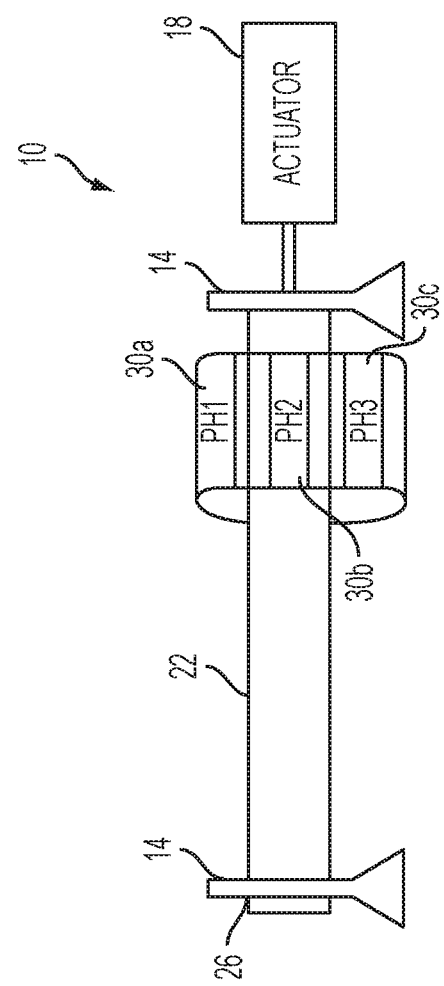
FIG. 1A shows a side longitudinal view of a printing system configured to form cylindrically shaped objects.

For a general understanding of the environment for the device and method disclosed herein as well as the details for the apparatus and method, reference is made to the drawings. In the drawings, like reference numerals designate like elements.

A side longitudinal view of three-dimensional object printing system 10 is shown in FIG. 1A. The printing system 10 includes a pair of supports 14 that support a cylindrical member 22, which is operatively connected to actuator 18. The supports 14 have a through-hole 26 that receive an end of the cylindrical member 22. While the supports 14 are shown as having a through-hole that can be fitted with a bearing, the supports could be open with a U-shaped saddle to accommodate the cylindrical member 22. While the system 10 of FIG. 1A has two supports for the cylindrical member 22, more supports can be provided, particularly in embodiments that translate as well as rotate the cylindrical member 22. Actuator 18 is configured to rotate the cylindrical member 22 and, in some embodiments, includes a linear actuator that pulls and pushes the cylindrical member 22 bi-directionally in the direction of the longitudinal axis of the cylindrical member 22. The depicted system 10 also includes three printheads 30a, 30b, and 30c that are positioned circumferentially about the cylindrical member 22 to enable the printheads to eject drops of material onto the cylindrical member 22 as the actuator 18 rotates and, in some embodiments, translates the cylindrical member. An embodiment could have fewer or more printheads as long as both build material and support material can be ejected for formation of the object.

Figure 1C:
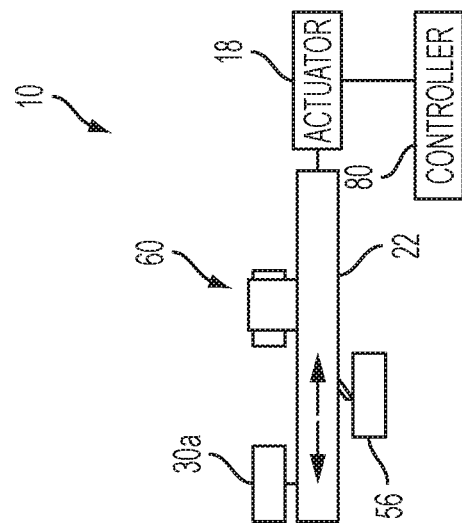
FIG. 1C shows another side longitudinal view of the printing system that illustrates an offset configuration of the components used to build and treat a cylindrically shaped object as the cylindrical member about which the object is formed is translated along the longitudinal axis of the member.
Figure 1B:
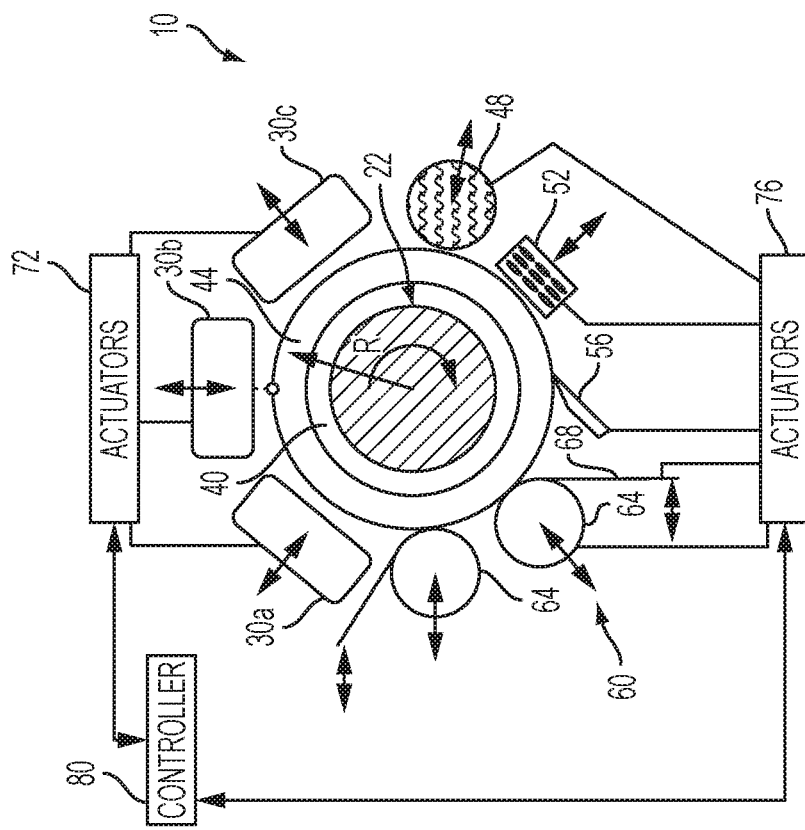
FIG. 1B shows an end view of the printing system configured to form cylindrically shaped objects depicted in FIG. 1A.

An end view of the system 10 is shown in FIG. 1B. In that view, the cylindrical member 22 has a layer 40 of a first material and a layer 44 formed of two materials. The layer 40 is a support material that was ejected by printhead 30a and the two materials in layer 44 were ejected from printheads 30b and 30c. The materials can have different properties, different colors, or both. In addition to the printheads, the system 10 includes a leveler 48, a curing device 52, a cutter 56, and a polisher 60. The leveler 48, curing device 52, cutter 56, and polisher 60 are generically called an object treating device in this document. As used in this document, "object treating device" refers to any device configured to modify a characteristic of one of the materials ejected from the printheads. The leveler 48 is a device configured to remove material from an outer layer on the member 22 at a predetermined height. The curing device is configured to emit a radiation that partially or completely solidifies material ejected onto the member 22. The radiation can be ultraviolet, thermal, infrared, or some other frequency range that is appropriate to solidify one or more materials ejected by the printheads 30a, 30b, and 30c. The material must be cured or solidified prior to performing any treatments that remove material from a layer. Such curing or solidifying can be achieved by rotating the shaft to obtain multiple charges of radiation as necessary. In the embodiment shown in FIG. 1B, printhead 30a ejects support material, such as a wax, while the printheads 30b and 30c eject build materials for forming an object. The cutter 56 is a blade or other hardened article with a sharpened point useful for removing material from an outer layer at depths that are greater than those capable with the leveler 48. The polisher 60 includes at least a pair of rollers 64 about which an endless belt 68 is entrained. The endless belt is impregnated with grit or other abrasive to apply a surface finish to an outer layer on the member 22.

As shown in FIG. 1B, actuators 72 and 76 are operatively connected to the printheads 30a, 30b, 30c, leveler 48, curing device 52, cutter 56, endless belt 64, and at least one roller 64 of polisher 60. A controller 80 is operatively connected to the actuators 72 and 76. The controller 80 is configured to operate the actuators 72 and 76 selectively to move the printheads, leveler, curing device, cutter, and polisher in a radial direction with respect to the center of cylindrical member 22. This operation enables the object treating devices and the printheads to be moved to a position with reference to an outer surface of the object being constructed about member 22 so the treating device or printhead can effectively perform its intended function. Additionally, the controller 80 operates the actuators 76 to drive at least one roller 64 of the polisher 60 to rotate the endless belt about the rollers 64.

As shown in FIG. 1C, the components of system 10 can be offset from one another along the longitudinal axis of the cylindrical member 22. As shown in the figure, the printhead 30a, the cutter 56, and the polisher 60 are offset along a direction parallel to the longitudinal axis of the member 22 and are positioned on different sides of the member 22. The actuator 18 is operated by controller 80 to regulation the rate of rotation of the member 22 and to translate the member 22 so material ejected by the printhead can be moved to a position opposite an object treating device for treatment of the object being constructed about member 22.

A process 200 for operating a printing system 10 configured as described above is shown in FIG. 2. Statements that the process is performing some task or function refers to a controller or general purpose processor executing programmed instructions stored in non-transitory computer readable storage media operatively connected to the controller or processor to manipulate data and operate one or more components in the system to perform the task or function. The controller 80 of the printing system 10 noted above can be configured with components and programmed instructions to provide a controller or processor that performs the process 200. Alternatively, the controller can be implemented with more than one processor and associated circuitry and components, each of which is configured to form one or more tasks or functions described below.

Figure 2:
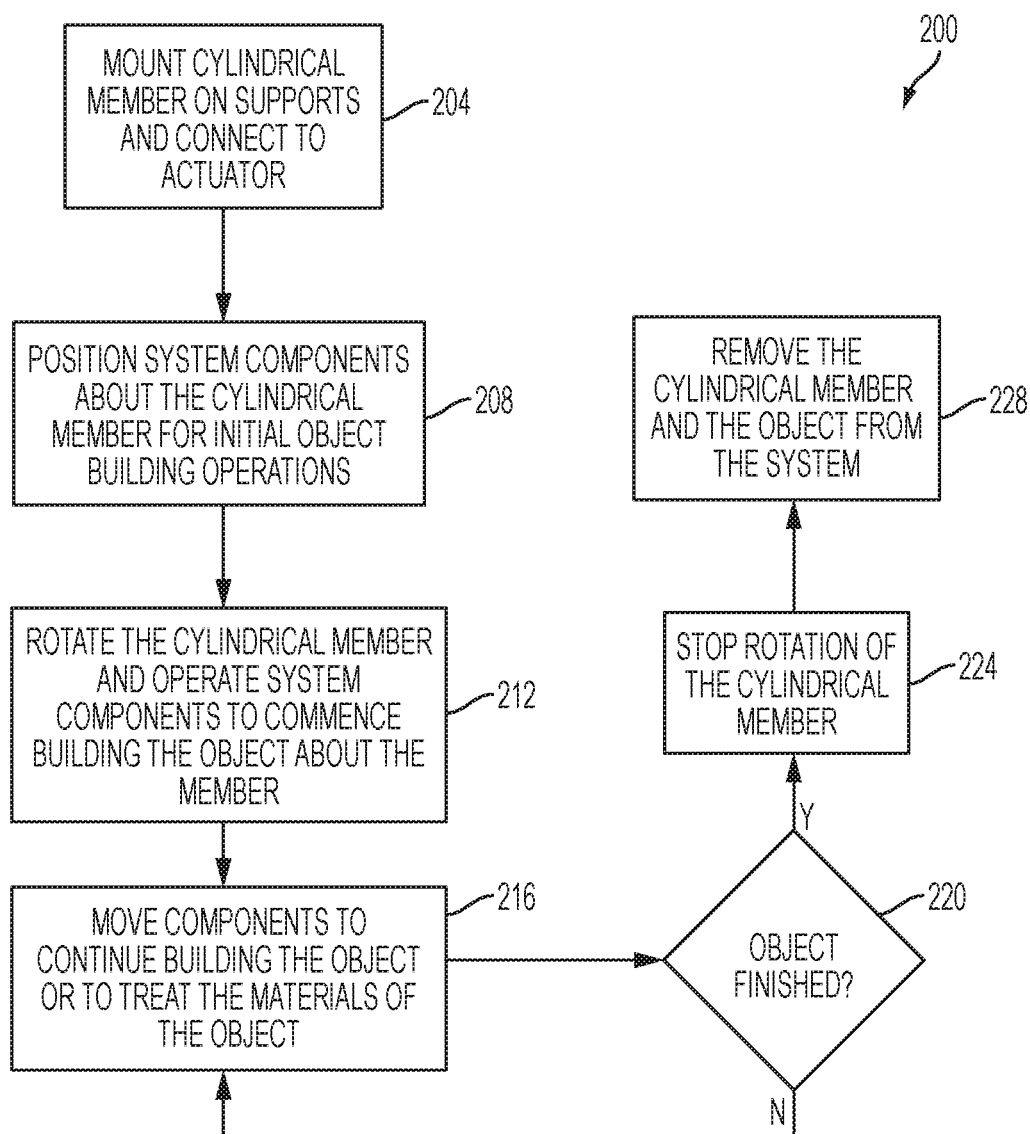
FIG. 2 depicts a method for operating a printer to form a cylindrically shaped object.

With reference to FIG. 2, the process begins with the mounting of a cylindrical member onto two or more supports and operatively connecting the cylindrical member to an actuator (block 204). Actuators operatively connected to printheads that eject material onto the cylindrical member and to the object treating devices positioned about the cylindrical member are operated to retract those components not required for one or more first operations to be performed with the cylindrical member or to position those components needed to perform the one or more first operations (block 208). The actuator operatively connected to the cylindrical member is activated to rotate the cylindrical member and the components performing the one or more first operations are operated accordingly (block 212). Typically, the first operations involve the operation of the ejectors in a plurality of printheads positioned about the rotating cylindrical member to eject different materials onto the rotating member and form layers on the rotating member. Other operations preliminary to the ejection of those materials can be performed, such as polishing or the cutting of structure into the member. The rotating shaft and components positioned about the rotating member can be moved as necessary to continue fabrication of the object layers on the member or to treat layers being formed on the member (block 216). For example, as layers are formed, a linear actuator can be operated to move the rotating member in the direction of its longitudinal axis to position particular areas of the member and the layers formed on the member opposite components that are longitudinally offset from one another along the member. Alternatively or additionally, actuators can be operated to move components away from or towards the rotating member in a radial direction to position the components appropriately with respect to the rotating member to perform operations on the layers of the rotating member. These operations include the retraction of the printheads to accommodate radial growth of the layers about the member, the positioning of a curing device to cure material on the member, and the positioning of a leveler, a polisher, or cutter into contact with material on the member. Once the operations are complete (block 220), the member rotation is terminated (block 224) and the member with the formed object is removed from the supports (block 228). Otherwise, the process continues the building of the object about the rotating member (block 216).

An example of an object formed about a cylindrical member is shown in an end view in FIG. 3A and from a longitudinal side view in FIG. 3B. In FIG. 3B, the object 300 has an inside layer 40 of a first material and an outside layer 44 made of two materials. The inside layer 40 is made of support material, which can be removed by melting or chemical action when the member 22 and object 300 are removed from the system 10. The elimination of the support layer 40 enables the release of the object 300 from the member 22. The process described above enables the object features, such as tab 304, teeth 308, and keys 312, to be formed in the object. These features can be formed with additional or different materials than the concentric material of layer 44. As shown in FIG. 3B, the ability to translate the member 22 enables material to be cut away in area 320. Also, translation of a specific portion of the object 300 to a position opposite the polisher 60 enables the area 316 in FIG. 3B to acquire a different surface finish than the remaining outer surface of the object 300. Thus, the system 10 and process 200 enable a cylindrical object to be quickly formed because the cylindrical shape of the member 22 is used to form a foundation for the object that is later removed. As used in this document, the term "cylindrical shaped object" refers to a three-dimensional structure that is formed about a cylindrical member that can have features extending from or cut into the walls of the object so the object can have an irregular surface that is generally cylindrical about its longitudinal center line.

It will be appreciated that variants of the above-disclosed and other features and functions, or alternatives thereof, may be desirably combined into many other different systems, applications or methods. Various presently unforeseen or unanticipated alternatives, modifications, variations, or improvements therein may be subsequently made by those skilled in the art, which are also intended to be encompassed by the following claims.

What is claimed is:

1. A method of operating a printer comprising:
   operating with a controller an actuator operatively connected to a cylindrical member to rotate the cylindrical member within at least two supports;
   operating with the controller a plurality of ejectors in each of at least two printheads supplied with different materials to form portions of layers on the rotating cylindrical member with the different materials supplied to the at least two printheads;
   operating with the controller at least one other actuator operatively connected to the at least two printheads and a curing device to move each of the printheads and the curing device independently of one another in a bidirectional radial direction with reference to a center of the rotating cylindrical member to enable the curing device to be positioned to modify the layers formed on the rotating cylindrical member while the cylindrical member is rotating within the at least two supports.

2. The method of claim 1 further comprising:
   operating with the controller a linear actuator operatively connected to the cylindrical member to move the cylindrical member along its longitudinal axis within the at least two supports.

3. The method of claim 2 further comprising:
   operating with the controller the linear actuator to move the rotating cylindrical member between the at least two printheads selectively.

4. The method of claim 1 further comprising:
   operating with the controller a leveler operatively connected to the controller to remove portions of at least one material ejected onto the rotating cylindrical member at a predetermined height.

5. The method of claim 1 further comprising:
   operating with the controller a cutter operatively connected to the controller to remove portions of at least one material ejected onto the rotating cylindrical member.

6. The method of claim 1 further comprising:
   operating with the controller a polisher operatively connected to the controller to treat a surface of an outer layer formed on the rotating cylindrical member.

7. The method of claim 1 further comprising:
   operating with the controller the at least one other actuator that is also operatively connected to at least one of two rollers about which an endless belt is entrained to rotate the endless belt and polish a surface of a layer of material formed on the rotating cylindrical member.

8. The method of claim 1 wherein the operation of the curing device irradiates the layers on the rotating cylindrical member with infrared radiation.

9. The method of claim 1 wherein the operation of the curing device irradiates the layers on the rotating cylindrical member with thermal radiation.

10. The method of claim 1 wherein the operation of the curing device irradiates the layers on the rotating cylindrical member with ultraviolet radiation.

11. The method of claim 1 further comprising:
    changing a rate of rotation of the rotating cylindrical member with the controller.

* * * * *